(12) United States Patent
Okamatsu

(10) Patent No.: US 9,771,503 B2
(45) Date of Patent: Sep. 26, 2017

(54) FLAT TIRE SEALING MATERIAL

(71) Applicant: The Yokohama Rubber Co., Ltd., Minato-ku, Tokyo (JP)

(72) Inventor: Takahiro Okamatsu, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 76 days.

(21) Appl. No.: 14/775,516

(22) PCT Filed: Mar. 12, 2014

(86) PCT No.: PCT/JP2014/056519
§ 371 (c)(1),
(2) Date: Sep. 11, 2015

(87) PCT Pub. No.: WO2014/142180
PCT Pub. Date: Sep. 18, 2014

(65) Prior Publication Data
US 2016/0040052 A1    Feb. 11, 2016

(30) Foreign Application Priority Data

Mar. 13, 2013   (JP) ................. 2013-050653

(51) Int. Cl.
*B29C 73/16* (2006.01)
*C09K 3/10* (2006.01)
*C08K 5/053* (2006.01)

(52) U.S. Cl.
CPC ............. *C09K 3/10* (2013.01); *B29C 73/163* (2013.01); *C08K 5/053* (2013.01)

(58) Field of Classification Search
CPC ............................. B29C 73/163; C08K 5/053
USPC ....................................... 523/166
See application file for complete search history.

(56) References Cited

U.S. PATENT DOCUMENTS

| | | |
|---|---|---|
| 2003/0050365 A1* | 3/2003 | Kishida ................ B29C 73/163 523/166 |
| 2004/0048962 A1 | 3/2004 | Kojima et al. |
| 2007/0149653 A1 | 6/2007 | Sugio et al. |
| 2011/0201722 A1 | 8/2011 | Takahara et al. |

FOREIGN PATENT DOCUMENTS

| | | |
|---|---|---|
| JP | 2003-082327 | 3/2003 |
| JP | 2003-082328 | 3/2003 |
| JP | 2004-035867 | 2/2004 |
| JP | 2005-170973 | 6/2005 |
| JP | 2007-182583 | 7/2007 |
| JP | 2011-026544 | 2/2011 |
| WO | WO 2005/056710 | 6/2005 |
| WO | WO 2010/150589 | 12/2010 |

OTHER PUBLICATIONS

International Search Report for International Application No. PCT/JP2014/056519 dated May 20, 2014, 4 pages, Japan.

* cited by examiner

*Primary Examiner* — Edward Cain
(74) *Attorney, Agent, or Firm* — Thorpe North & Western

(57) ABSTRACT

A tire puncture sealant according to the present technology is a tire puncture sealant containing a latex and/or an emulsion and an anti-freezing agent, the latex and/or emulsion containing, as solids, at least a polymer and/or an organic compound (other than the polymer), a content of solids being from 20 to 65% by mass with respect to the total mass of the sealant, and the difference between the specific gravity of the solids and the specific gravity of a mixture of water and anti-freezing agent in the tire puncture sealant being within ±0.1.

19 Claims, No Drawings

FLAT TIRE SEALING MATERIAL

TECHNICAL FIELD

The present technology relates to a tire puncture sealant.

BACKGROUND

Tire puncture sealants are conventionally used as emergency tire puncture repair fluids for repairing punctured tires. An example of such a tire puncture sealant has been proposed that contains a surfactant in order to prevent separation of the tire puncture sealant. The applicants of the present application have previously proposed a tire puncture sealant containing natural rubber latex and a surfactant, the sealant containing 1.0 to 6.0% by mass of the surfactant with respect to the solids in the natural rubber latex, the surfactant including a non-ionic surfactant and an anionic surfactant in a mass ratio of 1.0:1.0 to 1.0:5.0 non-ionic surfactant and anionic surfactant, respectively (Japanese Unexamined Patent Application Publication No. 2011-26544).

SUMMARY

The inventors of the present application have discovered that reducing the amount of surfactant allows for improved sealing performance on the part of the tire puncture sealant, and that, if a tire puncture sealant contains large amounts of surfactant, the tire puncture sealant will foam after being used, impeding post-treatment.

The inventors of the present application also discovered that a tire puncture sealant that exhibits no intra-system separation and has superior storage stability can be obtained even if the surfactants normally used when producing tire puncture sealants to prevent separation of the tire puncture sealant are omitted (e.g., not added to the tire puncture sealant) or the amount thereof is drastically reduced, and that the problem of separation in tire puncture sealants can be solved via methods other than surfactants.

Thus, the present technology provides a tire puncture sealant of superior storage stability.

A composition of the present technology comprises:
a tire puncture sealant containing a latex and/or an emulsion and an anti-freezing agent,
the latex and/or emulsion containing, as solids, at least a polymer and/or an organic compound (other than the polymer),
a content of solids being from 20 to 65% by mass with respect to the total mass of the sealant, and
the difference between the specific gravity of the solids and the specific gravity of a mixture of water and anti-freezing agent in the tire puncture sealant being within ±0.1 yields a tire puncture sealant of superior storage stability, thereby arriving at the present technology. Specifically, in storage stability testing modeled after extended periods of storage, the tire puncture sealant according to the present technology (1) exhibits little difference between the specific gravity of the solids and the specific gravity of a mixture of water and anti-freezing agent in the tire puncture sealant, and (2) has a content of solids of 20 to 65% by mass with respect to the total mass of the tire puncture sealant (allowing, for example, for a suitable level of polymer microparticle repulsion to be produced within the system), thereby preventing separation of the polymer and/or organic compound (other than the polymer) in the tire puncture sealant, maintaining the dispersibility of the polymer microparticles, and allowing good dispersion to be maintained. The tire puncture sealant according to the present technology also exhibits sealing performance similar to or better than that of previous sealants.

In addition, whereas the addition of an anti-freezing agent to a resin emulsion or NR latex generally disrupts the balance of the dispersion within the system, facilitating degradations in storage stability, balancing the amount of anti-freezing agent, the content of solids, and the specific gravity of the solids within the technology according to the present application allows dispersion of the solids (especially polymers) to be maintained.

It has also been discovered that the solids in the natural rubber latex in the technology according to the present application may have a low specific gravity, and that the addition of an anti-freezing agent (which typically has a higher specific gravity than water) thereto reduces the storage stability of the tire puncture sealant. It was also discovered that using, for example, natural rubber latex and a synthetic resin emulsion, the solids of which have a higher specific gravity than the natural rubber latex, to increase the specific gravity of the total solids within the latex and the emulsion so as to match the specific gravity of the mixture of water and anti-freezing agent (the specific gravity being, for example, greater than 1) in order to solve the problem described above maintains the dispersion of the solids and yields superior storage stability.

Specifically, the present technology provides the following 1 to 15.

1. A tire puncture sealant containing a latex and/or an emulsion and an anti-freezing agent,
the latex and/or emulsion containing, as solids, at least a polymer and/or an organic compound (other than the polymer),
a content of solids being from 20 to 65% by mass with respect to the total mass of the sealant, and
the difference between the specific gravity of the solids and the specific gravity of a mixture of water and anti-freezing agent in the tire puncture sealant being within ±0.1.

2. The tire puncture sealant according to 1, wherein a surfactant is not added thereto, or a surfactant is further added thereto in an amount of no more than 0.5 parts by weight per 100 parts by weight of the solids.

3. The tire puncture sealant according to 1 or 2, wherein the anti-freezing agent is at least one type selected from the group consisting of ethylene glycol, propylene glycol, diethylene glycol, glycerin, and 1,3-propanediol.

4. The tire puncture sealant according to any one of 1 to 3, wherein the mass ratio of the water and the anti-freezing agent is from 20:80 to 50:50.

5. The tire puncture sealant according to any one of 1 to 4, wherein a specific gravity of the solids is from 0.82 to 1.15.

6. The tire puncture sealant according to any one of 1 to 5, wherein the specific gravity of the mixture of water and anti-freezing agent is from 0.95 to 1.15.

7. The tire puncture sealant according to any one of 1 to 6, wherein the emulsion is a synthetic resin emulsion.

8. The tire puncture sealant according to any one of 1 to 7, wherein the latex is natural rubber latex.

9. The tire puncture sealant according to any one of 1 to 8, wherein the specific gravity of the solids in the latex is from 0.82 to 0.93.

10. The tire puncture sealant according to any one of 1 to 9, wherein the sealant contains the latex and the emulsion, the latex is natural rubber latex, the emulsion is a synthetic resin emulsion, and the specific gravity of the solids in the synthetic resin emulsion is at least 0.1 greater than the specific gravity of the solids in the natural rubber latex.

11. The tire puncture sealant according to any one of 1 to 10, wherein the polymer is at least one type selected from the group consisting of natural rubber, urethane resin, acrylic resin, polyolefin, polyvinyl acetate, polyvinyl chloride, ethylene-vinyl acetate copolymer, and ethylene-vinyl acetate-vinyl versatate copolymer.

12. The tire puncture sealant according to 11, wherein the ethylene-vinyl acetate copolymer has a vinyl acetate content that is no more than 55% by mass of the ethylene-vinyl acetate copolymer.

13. The tire puncture sealant according to 11 or 12, wherein the urethane resin is a compound formed using an aromatic polyisocyanate, an aromatic polyol, and a polyol containing an ionic functional group.

14. The tire puncture sealant according to any one of 1 to 13, containing a latex and/or an emulsion, the solids of which have a specific gravity of 1 or less, and a latex and/or an emulsion, the solids of which have a specific gravity of greater than 1.

15. A tire puncture sealant containing only a latex and/or an emulsion and an anti-freezing agent, the latex and/or the emulsion containing, as solids, at least a polymer and/or an organic compound (other than the polymer), a content of solids being from 20 to 65% by mass with respect to the total mass of the sealant, and the difference between the specific gravity of the solids and the specific gravity of a mixture of water and anti-freezing agent in the tire puncture sealant being within ±0.1.

The tire puncture sealant according to the present technology exhibits superior storage stability.

DETAILED DESCRIPTION

The present technology is described in detail below.

The tire puncture sealant according to the present technology contains a latex and/or an emulsion, and an anti-freezing agent, the latex and/or the emulsion containing, as solids, at least a polymer and/or an organic compound (other than the polymer);

a content of solids being from 20 to 65% by mass with respect to the total mass of the sealant, and the difference between the specific gravity of the solids and the specific gravity of a mixture of water and anti-freezing agent in the tire puncture sealant being within ±0.1.

In the present technology, specific gravity or density is as measured at 25° C. Specific gravity is calculated according to the following formula using the density 1.0 of water at 25° C. as a baseline (denominator).

Specific gravity=(density at 25° C.)/1.0

The tire puncture sealant of the present technology contains a latex and/or an emulsion and an anti-freezing agent.

Latexes that can be contained in the tire puncture sealant of the present technology contain water and solids. The solids include at least a polymer and/or organic compound (other than the polymer). In the present technology, the solids of the latex can be the latex from which the water has been removed. The same holds for the emulsion.

Thus, the tire puncture sealant of the present technology contains solids from a latex and/or an emulsion. In other words, the solids of the latex and/or emulsion constitute the solids of the tire puncture sealant of the present technology.

In the present technology, the solids of the tire puncture sealant can be solids not including the water, anti-freezing agent, and an optional inorganic substance or the like contained in the tire puncture sealant.

The solids of the latex and/or emulsion contained in the tire puncture sealant of the present technology contain at least a polymer and/or organic compound (other than the polymer).

One example of a preferred form for the polymer and/or organic compound is a dried solid.

There is no particular limitation upon the latex and/or emulsion contained in the tire puncture sealant according to the present technology as long as it contains a polymer and/or organic compound. The polymer and/or organic compound is, for example, in the form of a water-based mixture of microparticles of the polymer and/or organic compound dispersed in water.

For the sake of improved storage stability and superior sealing performance, the latex is preferably natural rubber latex.

The latex is, for example, natural rubber latex.

The specific gravity of the solids in the natural rubber latex is preferably from 0.82 to 0.93, more preferably from 0.83 to 0.89, for the sake of improved storage stability and superior sealing performance.

The emulsion is, for example, a synthetic resin emulsion. For the sake of improved storage stability and superior sealing performance, the emulsion is preferably a synthetic resin emulsion. Examples of synthetic resin emulsions include urethane resin emulsions, (meth)acrylic resin emulsions, polyolefin emulsions, polyvinyl acetate emulsions, polyvinyl chloride emulsions, ethylene-vinyl acetate (EVA) copolymer emulsions, and ethylene-vinyl acetate-vinyl versatate copolymer emulsions.

Examples of polymers contained in the latex and/or emulsion include natural rubber, synthetic resins such as urethane resin, (meth)acrylic resin, polyolefins, ethylene-vinyl acetate copolymer (EVA), vinyl acetate polymer, polyvinyl chloride copolymer, and ethylene-vinyl acetate-vinyl versatate copolymer, and water-soluble resins (tackifiers).

There is no particular limitation upon the organic compound contained in the latex and/or emulsion as long as it is an organic substance (other than the polymers described above) typically contained in latexes or emulsions. One example is a surfactant. In the present technology, the polymer is excluded from the organic compound contained in the latex and/or emulsion. There is no particular limitation upon the surfactant. Examples thereof include conventionally known natural rubber latexes.

For the sake of improved storage stability and superior sealing performance, preferable examples of the latex and/or emulsion are natural rubber latex, a urethane resin emulsion, and an ethylene-vinyl acetate copolymer emulsion.

The specific gravity of the solids of the synthetic resin emulsion is preferably from 1.00 to 1.25, more preferably from 1.00 to 1.15, for the sake of improved storage stability and superior sealing performance.

A single latex or emulsion or a combination of two or more types thereof can be used. If the tire puncture sealant according to the present technology contains, for example, a latex and an emulsion, the sealant preferably contains two or more types of emulsions for the sake of improved storage stability and superior sealing performance.

It is especially preferable to use a combination of natural rubber latex and a synthetic resin emulsion for the sake of improved storage stability and superior sealing performance, and more preferable to use a combination of natural rubber latex and a urethane resin emulsion and/or ethylene-vinyl acetate copolymer emulsion.

If a combination of natural rubber latex and a synthetic resin emulsion is used, the mass ratio of the solids in the natural rubber latex and the solids in the synthetic resin emulsion (NR latex solids:synthetic resin emulsion solids) is preferably from 30:70 to 90:10 for the sake of improved storage stability and superior sealing performance.

If a combination of natural rubber latex and a urethane resin emulsion is used, the mass ratio of the solids in the natural rubber latex and the solids in the urethane resin emulsion (NR latex solids:urethane resin emulsion solids) is preferably from 30:70 to 90:10, more preferably from 40:60 to 70:30, for the sake of improved storage stability and superior sealing performance.

If a combination of natural rubber latex and an ethylene-vinyl acetate copolymer emulsion is used, the mass ratio of the solids in the natural rubber latex and the solids in the ethylene-vinyl acetate copolymer emulsion (NR latex solids:ethylene-vinyl acetate copolymer emulsion solids) is preferably from 30:70 to 90:10, more preferably from 40:60 to 70:30, for the sake of improved storage stability and superior sealing performance.

If a combination of natural rubber latex and a synthetic resin emulsion is used, the specific gravity of the solids in the synthetic resin emulsion is preferably at least 0.1 greater than the specific gravity of the solids in the natural rubber latex, more preferably about from 0.11 to 0.15 greater, for the sake of improved storage stability and superior sealing performance.

For the sake of improved storage stability and superior sealing performance, a latex/emulsion combination containing a latex and/or emulsion in which the specific gravity of the solids in the latex and/or emulsion is 1 or less and a latex and/or emulsion in which the specific gravity of the solids in the latex and/or emulsion is greater than 1 is preferable.

In this case, the two may contain identical or different types of polymers. Examples include:

(1) a combination of a natural rubber latex, the solids of which have a specific gravity of 1 or less, and a urethane resin emulsion (such as an aromatic urethane resin emulsion) and/or an ethylene-vinyl acetate copolymer emulsion (such as an ethylene-vinyl acetate copolymer having an vinyl acetate content of 55% by mass or less), the solids of which have a specific gravity of greater than 1; and (2) a combination of a urethane resin emulsion (such as an aliphatic urethane resin emulsion), the solids of which have a specific gravity of 1 or less and a urethane resin emulsion (such as an aromatic urethane resin emulsion) and/or an ethylene-vinyl acetate copolymer emulsion the solids of which have a specific gravity of greater than 1.

For the sake of improved storage stability and superior sealing performance, the mass ratio of the content of solids in the latex and/or emulsion in which the specific gravity of the solids is 1 or less and the mass ratio of the content of solids in the latex and/or emulsion in which the specific gravity of the solids is greater than 1 (solids of specific gravity or 1 or less:solids of specific gravity of greater than 1) is preferably from 10:90 to 70:30, and more preferably from 30:70 to 60:40.

For the sake of improved storage stability and superior sealing performance, the specific gravity of the solids in the latex and/or emulsion in which the specific gravity of the solids is greater than 1 is preferably at least 0.1 greater, more preferably from 0.11 to 0.15 greater, than the solids of the latex and/or emulsion in which the specific gravity of the solids is 1 or less.

There is no particular limitation upon an ethylene-vinyl acetate copolymer emulsion constituting the synthetic resin emulsion. For the sake of improved storage stability and superior sealing performance, the vinyl acetate content of the ethylene-vinyl acetate copolymer is preferably no more than 55% by mass of the ethylene-vinyl acetate copolymer, and more preferably from 25 to 50% by mass.

There is no particular limitation upon a urethane resin emulsion constituting the synthetic resin emulsion. One example is a compound (such as a urethane prepolymer) formed using a polyisocyanate (compound comprising two or more isocyanate groups), a polyol (compound comprising two or more hydroxy groups, except for polyols comprising ionic functional groups), and a polyol comprising an ionic functional group (such as a compound comprising two or more hydroxy groups and one or more carboxyl groups as an ionic functional group). For the sake of improved storage stability and superior sealing performance, the polyisocyanate is preferably, for example, an aromatic polyisocyanate such as toluene diisocyanate or diphenylmethane diisocyanate. For the sake of improved storage stability and superior sealing performance, the polyol is preferably an aliphatic polyester polyol such as hexanediol adipate or butanediol adipate; an aromatic polyol (specific examples including aromatic polyester polyols such as polyethylene terephthalate); or a polyether polyol such as polypropylene glycol or polytetramethylene glycol. Examples of ionic functional group-comprising polyols include dimethylol propionic acid and dimethylol butanoic acid. The urethane resin emulsion is preferably a polyether-based or polyester-based urethane resin emulsion. An example of a preferred form of the urethane functioning as the polymer in the urethane resin emulsion is a urethane prepolymer.

For the sake of improved storage stability and superior sealing performance, the weight-average molecular weight of the polymer is preferably from 100,000 to 1,000,000, and more preferably from 200,000 to 700,000. For the sake of improved storage stability and superior sealing performance, the weight-average molecular weight of the urethane resin is preferably from 100,000 to 1,000,000, and more preferably from 200,000 to 700,000. In the present technology, the weight-average molecular weight of the urethane resin is calculated in terms of polystyrene as determined via gel permeation chromatography (GPC) using tetrahydrofuran (THF) as the solvent.

For the sake of improved storage stability and superior sealing performance, the weight-average molecular weight of the EVA is preferably from 100,000 to 1,000,000, and more preferably from 400,000 to 700,000. The weight-average molecular weight of the ethylene-vinyl acetate copolymer is calculated in terms of polystyrene as determined via gel permeation chromatography (GPC) using N,N'-dimethyl formamide (DMF) as the solvent.

In addition to the components described above, the latex and/or emulsion used in the tire puncture sealant according to the present technology can contain additives such as inorganic substances, fillers, anti-aging agents, antioxidants, pigments (dyes), plasticizers, thixotropic agents, UV absorbers, flame retardants, dispersing agents, dehydrating agents, and antistatic agents.

There is no particular limitation upon the manner in which the latex or emulsion is produced. Examples thereof include conventionally known substances.

There is no particular limitation upon the anti-freezing agent contained in the tire puncture sealant according to the present technology. In particular, in order to prevent freezing of the tire puncture sealant and obtain improved storage stability and superior sealing performance, at least one type selected from the group consisting of ethylene glycol, propylene glycol, diethylene glycol, glycerol, and 1,3-propanediol is preferable.

For the sake of improved storage stability and superior sealing performance, the specific gravity of the anti-freezing agent is preferably from 0.95 to 1.3, and more preferably from 1.0 to 1.2.

There is no particular limitation upon the manner in which the anti-freezing agent is produced. A single anti-freezing agent may be used alone or a combination of two or more anti-freezing agents may be used.

Because the tire puncture sealant according to the present technology has superior storage stability, a surfactant is not added to the latex and/or emulsion; alternatively, if a surfactant is further added to the latex and/or emulsion, only a trace amount of surfactant need be added. Not adding a surfactant, or only adding a small amount of surfactant, in this way prevents foaming of the tire puncture sealant, facilitating treatment thereof, and yields a sealant of superior sealing performance.

If a surfactant is further added to the latex and/or emulsion in the tire puncture sealant according to the present technology, there is no particular limitation upon the added surfactant. Examples include anionic surfactants, cationic surfactants, amphoteric ionic surfactants, and nonionic surfactants.

The surfactant may be used alone or in combinations of two or more types.

For the sake of improved storage stability and superior workability (little foaming, easy post-treatment) and sealing performance, the amount of surfactant added to the tire puncture sealant is preferably no more than 5 parts by mass per 100 parts by mass solids in the latex and/or emulsion, more preferably less than 1 part by mass, still more preferably 0.5 parts by mass or less, and especially preferably 0.1 parts by mass or less.

If the latex and/or emulsion used to produce the tire puncture sealant according to the present technology contains a surfactant to begin with, the surfactant is included in the solids of the latex and/or emulsion.

In addition to the components described above, the tire puncture sealant according to the present technology can contain additives such as fillers, anti-aging agents, antioxidants, pigments (dyes), plasticizers, thixotropic agents, UV absorbers, flame retardants, dispersing agents, dehydrating agents, and antistatic agents.

In the present technology, the content of solids in the latex and/or emulsion (or total content of solids if more than one latex and/or emulsion is used; likewise hereafter) is from 20 to 65% by mass of the total mass of the tire puncture sealant. A content of solids in this range yields superior storage stability and sealing performance. For the sake of improved storage stability and superior sealing performance, the content of solids contained in the latex and/or emulsion with respect to the total mass of the tire puncture sealant is preferably from 25 to 60% by mass, and more preferably from 25 to 55% by mass.

For the sake of improved storage stability and superior sealing performance, the amount of polymer and/or organic compound in the solids of the latex and/or emulsion is preferably from 60 to 90% by mass of the solids of the latex and/or emulsion, and more preferably from 70 to 90% by mass.

For the sake of improved storage stability and superior sealing performance, the specific gravity of the solids in the latex and/or emulsion (or the specific gravity of the total solids if more than one latex and/or emulsion is used; likewise hereafter) in the present technology is preferably from 0.82 to 1.15, more preferably from 0.83 to 1.05, still more preferably from 0.85 to 1.05, and especially preferably from 0.96 to 1.02.

For the sake of improved storage stability and superior sealing performance, the specific gravity of the mixture of water and anti-freezing agent in the tire puncture sealant is preferably from 0.95 to 1.15, and more preferably from 1.0 to 1.1.

In the present technology, the difference (A–B) between the specific gravity of the solids in the latex and/or emulsion (referred to as "specific gravity A") and the specific gravity of the mixture of water and anti-freezing agent in the tire puncture sealant (referred to as "specific gravity B") is within ±0.1. Having such a difference fall within this range yields superior storage stability and sealing performance. For the sake of improved storage stability and superior sealing performance, the difference between A and B is preferably within ±0.08, and more preferably within ±0.07. For the sake of improved storage stability and superior sealing performance, A–B is preferably 0 or less.

For the sake of improved storage stability and superior sealing performance, the mass ratio (water:anti-freezing agent) of water to anti-freezing agent is preferably from 20:80 to 50:50, and more preferably from 30:70 to 50:50.

For the sake of improved storage stability and superior sealing performance, the water content of the tire puncture sealant is preferably from 30 to 300 parts by mass, and more preferably from 40 to 200 parts by mass, per 100 parts by mass solids in the latex and/or emulsion used to produce the tire puncture sealant. The water contained in the tire puncture sealant may be derived from the latex and/or emulsion.

For the sake of improved storage stability and superior sealing performance, the anti-freezing agent content of the tire puncture sealant is preferably from 30 to 300 parts by mass, and more preferably from 40 to 200 parts by mass, per 100 parts by mass solids in the latex and/or emulsion used to produce the tire puncture sealant.

The method of producing the tire puncture sealant of the present technology is not particularly limited. One example is a method in which, for example, the latex and/or emulsion, the anti-freezing agent, and, as necessary, a surfactant and additives are introduced into a vessel and mixed under vacuum using a mixer or other agitating device to produce the sealant. There is no particular limitation on the order in which the components are added; for example, the components can be added in the order of NR latex or other latex, EVA emulsion or other emulsion, and anti-freezing agent.

The method of using the tire puncture sealant of the present technology is not particularly limited. Examples thereof include conventionally known substances.

The tire puncture sealant of the present technology can be used as, for example, a tire puncture repair fluid for temporary repairs that can be squeezed by hand.

Another tire puncture sealant according to the present technology will now be described.

Another tire puncture sealant according to the present technology
contains only a latex and/or emulsion and an anti-freezing agent, the latex and/or emulsion containing, as solids, at least a polymer and/or an organic compound (other than the polymer), a content of solids being from 20 to 65% by mass with respect to the total mass of the sealant, and the difference between the specific gravity of the solids and the specific gravity of a mixture of water and anti-freezing agent in the tire puncture sealant being within ±0.1.

This tire puncture sealant is identical to the tire puncture sealant according to the present technology described above apart from containing only a latex and/or emulsion and an anti-freezing agent.

Examples

The present technology is described below in detail using working examples. However, the present technology is not limited to such working examples.

<Evaluation>

A tire puncture sealant produced as described below was used to perform the following evaluations. The results are shown in the tables.

Vibration Test (Storage Stability Evaluation)

The obtained tire puncture sealant was introduced into a vessel, the air in the vessel was substituted with nitrogen gas followed by sealing the vessel, and the vessel was vibrated at a frequency of 20 Hz at an amplitude of ±3 mm for seven days in 80° C. conditions.

After the vibration test, the tire puncture sealant was observed by eye, with cases in which no aggregation was observed in the tire puncture sealant being rated "excellent" and cases in which aggregation was present being rated "fail".

Puncture-Sealing Ability

A puncture hole (diameter: 4 mm) was formed in a shoulder groove portion of the tread of a tire.

Next, the punctured tire was mounted on a drum test machine, the obtained tire puncture sealant was injected into the tire through the valve, and the tire was inflated with air to an internal pressure of 200 kPa.

Repeated intermittent driving cycles were then performed by driving the tire at 30 km/hour under a load of 350 kg for one minute, followed by stopping the tire. After each stoppage, the tire was observed by eye and evaluated by spraying soapy water around the puncture hole. The process of intermittently driving the tire and the subsequent evaluation was repeated until there was no more air leakage.

Cases in which air leakage ceased after 1 to 10 repetitions of intermittent driving were rated "superior" for having highly superior sealing performance, cases in which air leakage ceased after 11 to 15 repetitions of intermittent driving were rated "excellent" for having superior sealing performance, and cases in which air leakage did not cease even after 16 or more repetitions of intermittent driving were rated "fail" for having inferior sealing performance. Cases in which puncture sealing performance was not evaluated are marked "--".

<Production of Tire Puncture Sealing Materials>

The components shown in the tables below were mixed to uniformity by stirring amounts thereof (parts by mass) as shown in the tables to produce tire puncture sealant (samples 1 to 34).

In the tables, "Solids" in the "Latex or emulsion" row is the total amount of components other than water in the latex or emulsion. In the tables, "Water" is the amount of water in the latex or emulsion (or the total water content if more than one latex or emulsion is used).

"Specific gravity" in the "Latex or emulsion" row is the specific gravity of the total components other than water in the latex or emulsion (i.e., the solids of the latex and/or emulsion).

In the present technology, the specific gravity of the solids of the latex or emulsion was measured by drying a cubic centimeter of the latex or emulsion for two hours at 105° C. to remove the water, followed by measuring the remaining solids at 25° C. using an electronic scale.

TABLE 1

| | | Solids (% by mass) | Specific gravity at 25° C. | Sample No. | | | | |
|---|---|---|---|---|---|---|---|---|
| | | | | 1 | 2 | 3 | 4 | 5 |
| | | | | Working Example/Comparative Example | | | | |
| | | | | Working Example | | Comparative Example | | |
| | | | | Mixture ratio (solids:parts by mass) | | | | |
| Latex or emulsion | Polyurethane (TDI-based) | 40 | 1.120 | 40 | 30 | 20 | 10 | 0 |
| | Natural rubber | 60 | 0.860 | 60 | 70 | 80 | 90 | 100 |
| | Mixture specific gravity A | | | 0.964 | 0.938 | 0.912 | 0.886 | 0.86 |
| Antifreezing agent | EG | Specific gravity at 25° C. | 1.113 | 50 | 50 | 50 | 50 | 50 |
| | PG | | 1.036 | 50 | 50 | 50 | 50 | 50 |
| Water | | | 0.994 | 100 | 100 | 100 | 100 | 100 |
| Specific gravity B of mixture of anti-freezing agent and water | | | | 1.034 | 1.034 | 1.034 | 1.034 | 1.034 |
| Difference in specific gravity (A − B) | | | | −0.070 | −0.096 | −0.122 | −0.148 | −0.174 |
| Solids (% by mass) | | | | 33.3 | 33.3 | 33.3 | 33.3 | 33.3 |
| Vibration test results (20 Hz, 3 mm, 1 wk at 80° C.) | | | | Excellent | Excellent | Fail | Fail | Fail |
| Puncture-sealing ability | | | | Excellent | Excellent | Superior | — | Superior |

TABLE 1-continued

|  |  | Solids (% by mass) | Specific gravity at 25° C. | Sample No. | | |
|---|---|---|---|---|---|---|
|  |  |  |  | 6 | 7 | 8 |
|  |  |  |  | Working Example/ Comparative Example | | |
|  |  |  |  | Working Example | | |
|  |  |  |  | Mixture ratio (solids:parts by mass) | | |
| Latex or emulsion | Polyurethane (TDI-based) | 40 | 1.120 | 50 | 60 | 70 |
|  | Natural rubber | 60 | 0.860 | 50 | 40 | 30 |
|  | Mixture specific gravity A |  |  | 0.99 | 1.016 | 1.042 |
| Antifreezing agent | EG | Specific gravity at 25° C. | 1.113 | 50 | 50 | 50 |
|  | PG |  | 1.036 | 50 | 50 | 50 |
| Water |  |  | 0.994 | 100 | 100 | 100 |
| Specific gravity B of mixture of anti-freezing agent and water |  |  |  | 1.034 | 1.034 | 1.034 |
| Difference in specific gravity (A − B) |  |  |  | −0.044 | −0.018 | 0.008 |
| Solids (% by mass) |  |  |  | 33.3 | 33.3 | 33.3 |
| Vibration test results (20 Hz, 3 mm, 1 wk at 80° C.) |  |  |  | Excellent | Excellent | Excellent |
| Puncture-sealing ability |  |  |  | Excellent | Excellent | — |

|  |  | Solids (% by mass) | Specific gravity at 25° C. | Sample No. | | |
|---|---|---|---|---|---|---|
|  |  |  |  | 9 | 10 | 11 |
|  |  |  |  | Working Example/ Comparative Example | | |
|  |  |  |  | Working Example | | |
|  |  |  |  | Mixture ratio (solids:parts by mass) | | |
| Latex or emulsion | Polyurethane (TDI-based) | 40 | 1.120 | 80 | 90 | 100 |
|  | Natural rubber | 60 | 0.860 | 20 | 10 | 0 |
|  | Mixture specific gravity A |  |  | 1.068 | 1.094 | 1.12 |
| Antifreezing agent | EG | Specific gravity at 25° C. | 1.113 | 50 | 50 | 50 |
|  | PG |  | 1.036 | 50 | 50 | 50 |
| Water |  |  | 0.994 | 100 | 100 | 100 |
| Specific gravity B of mixture of anti-freezing agent and water |  |  |  | 1.034 | 1.034 | 1.034 |
| Difference in specific gravity (A − B) |  |  |  | 0.034 | 0.060 | 0.086 |
| Solids (% by mass) |  |  |  | 33.3 | 33.3 | 33.3 |
| Vibration test results (20 Hz, 3 mm, 1 wk at 80° C.) |  |  |  | Excellent | Excellent | Excellent |
| Puncture-sealing ability |  |  |  | — | — | Excellent |

TABLE 2

|  |  | Solids (% by mass) | Specific gravity at 25° C. | Sample No. | | |
|---|---|---|---|---|---|---|
|  |  |  |  | 1 | 12 | 13 |
|  |  |  |  | Working Example/ Comparative Example | | |
|  |  |  |  | Working Example | | |
|  |  |  |  | Mixture ratio (solids) | | |
| Latex or emulsion | Polyurethane (TDI-based) | 40 | 1.120 | 40 | 40 | 40 |
|  | Natural rubber | 60 | 0.860 | 60 | 60 | 60 |
|  | Mixture specific gravity A |  |  | 0.964 | 0.964 | 0.964 |
| Antifreezing agent | EG | Specific gravity at 25° C. | 1.113 | 50 | 50 | 100 |
|  | PG |  | 1.036 | 50 | 50 | 100 |
| Water |  |  | 0.994 | 100 | 200 | 200 |
| Specific gravity B of mixture of anti-freezing agent and water |  |  |  | 1.034 | 1.021 | 1.034 |

TABLE 2-continued

|  |  |  |  |  |  |
|---|---|---|---|---|---|
| Difference in specific gravity (A − B) |  |  | −0.070 | −0.057 | −0.070 |
| Solids (% by mass) |  |  | 33.3 | 25 | 20 |
| Vibration test results (20 Hz, 3 mm, 1 wk at 80° C.) |  |  | Excellent | Excellent | Excellent |
| Puncture-sealing ability |  |  | Excellent | — | — |

|  |  |  |  | Sample No. | | | |
|---|---|---|---|---|---|---|---|
|  |  |  |  | 14 | 15 | 16 | 17 |
|  |  |  |  | Working Example/Comparative Example | | | |
|  |  | Solids (% by mass) | Specific gravity at 25° C. | Comparative Example | | Working Example | |
|  |  |  |  | Mixture ratio (solids) | | | |
| Latex or emulsion | Polyurethane (TDI-based) | 40 | 1.120 | 40 | 40 | 40 | 40 |
|  | Natural rubber | 60 | 0.860 | 60 | 60 | 60 | 60 |
|  | Mixture specific gravity A |  |  | 0.964 | 0.964 | 0.964 | 0.964 |
| Antifreezing agent | EG | Specific gravity at 25° C. | 1.113 | 100 | 100 | 50 | 50 |
|  | PG |  | 1.036 | 100 | 100 | 50 | 50 |
| Water |  |  | 0.994 | 250 | 300 | 50 | 50 |
| Specific gravity B of mixture of anti-freezing agent and water |  |  |  | 1.030 | 1.026 | 1.048 | 1.054 |
| Difference in specific gravity (A − B) |  |  |  | −0.066 | −0.062 | −0.084 | −0.090 |
| Solids (% by mass) |  |  |  | 18.1 | 16.6 | 40 | 50 |
| Vibration test results (20 Hz, 3 mm, 1 wk at 80° C.) |  |  |  | Fail | Fail | Excellent | Excellent |
| Puncture-sealing ability |  |  |  | Fail | Fail | — | — |

TABLE 3

|  |  |  |  | Sample No. | | |
|---|---|---|---|---|---|---|
|  |  |  |  | 18 | 19 | 20 |
|  |  |  |  | Working Example/Comparative Example | | |
|  |  | Solids (% by mass) | Specific gravity at 25° C. | Comparative Example | | |
|  |  |  |  | Mixture ratio (solids) | | |
| Latex or emulsion | Polyurethane (TDI-based) | 40 | 1.120 |  |  | 15 |
|  | Polyurethane (HDI-based) | 40 | 0.870 | 40 | 80 | 85 |
|  | EVA (30% ethylene) | 50 | 1.120 |  |  |  |
|  | EVA (50% ethylene) | 50 | 1.010 |  |  |  |
|  | EVA (60% ethylene) | 50 | 1.060 |  |  |  |
|  | Natural rubber | 60 | 0.860 | 60 | 20 |  |
|  | Mixture specific gravity A |  |  | 0.864 | 0.868 | 0.9075 |
| Antifreezing agent | EG | Specific gravity at 25° C. | 1.113 |  |  |  |
|  | PG |  | 1.036 | 100 | 100 | 100 |
|  | DEG |  | 1.116 |  |  |  |
|  | Gly |  | 1.261 |  |  |  |
|  | 1,3-PG |  | 1.059 |  |  |  |
| Water |  |  | 0.994 | 100 | 100 | 100 |
| Specific gravity B of mixture of anti-freezing agent and water |  |  |  | 1.015 | 1.015 | 1.015 |
| Difference in specific gravity (A − B) |  |  |  | −0.151 | −0.147 | −0.1075 |
| Solids (% by mass) |  |  |  | 33.3 | 21.7 | 22.2 |
| Vibration test results (20 Hz, 3 mm, 1 wk at 80° C.) |  |  |  | Fail | Fail | Fail |
| Puncture-sealing ability |  |  |  | Excellent | Excellent | Excellent |

|  |  |  |  | Sample No. | | |
|---|---|---|---|---|---|---|
|  |  |  |  | 21 | 22 | 23 |
|  |  |  |  | Working Example/Comparative Example | | |
|  |  | Solids (% by mass) | Specific gravity at 25° C. | Working Example | | |
|  |  |  |  | Mixture ratio (solids) | | |
| Latex or emulsion | Polyurethane (TDI-based) | 40 | 1.120 | 25 | 40 | 90 |
|  | Polyurethane (HDI-based) | 40 | 0.870 | 75 | 60 | 10 |
|  | EVA (30% ethylene) | 50 | 1.120 |  |  |  |

TABLE 3-continued

|  |  | Solids (% by mass) | Specific gravity at 25° C. |  |  |  |
|---|---|---|---|---|---|---|
|  | EVA (50% ethylene) | 50 | 1.010 |  |  |  |
|  | EVA (60% ethylene) | 50 | 1.060 |  |  |  |
|  | Natural rubber | 60 | 0.860 |  |  |  |
|  | Mixture specific gravity A |  |  | 0.9325 | 0.97 | 1.095 |
| Antifreezing agent | EG | Specific gravity at 25° C. | 1.113 |  |  |  |
|  | PG |  | 1.036 | 100 | 100 | 100 |
|  | DEG |  | 1.116 |  |  |  |
|  | Gly |  | 1.261 |  |  |  |
|  | 1,3-PG |  | 1.059 |  |  |  |
| Water |  |  | 0.994 | 100 | 100 | 100 |
| Specific gravity B of mixture of anti-freezing agent and water |  |  |  | 1.015 | 1.015 | 1.015 |
| Difference in specific gravity (A − B) |  |  |  | −0.0825 | −0.045 | 0.08 |
| Solids (% by mass) |  |  |  | 22.2 | 22.2 | 22.2 |
| Vibration test results (20 Hz, 3 mm, 1 wk at 80° C.) |  |  |  | Excellent | Excellent | Excellent |
| Puncture-sealing ability |  |  |  | Excellent | — | — |

|  |  |  |  | Sample No. | | | |
|---|---|---|---|---|---|---|---|
|  |  |  |  | 24 | 25 | 26 | 27 |
|  |  |  |  | Working Example/Comparative Example | | | |
|  |  | Solids (% by mass) | Specific gravity at 25° C. | Comparative Example | Working Example | Comparative Example | Working Example |
|  |  |  |  | Mixture ratio (solids) | | | |
| Latex or emulsion | Polyurethane (TDI-based) | 40 | 1.120 | 40 |  |  |  |
|  | Polyurethane (HDI-based) | 40 | 0.870 | 60 |  |  |  |
|  | EVA (30% ethylene) | 50 | 1.120 |  | 50 | 40 | 40 |
|  | EVA (50% ethylene) | 50 | 1.010 |  |  |  |  |
|  | EVA (60% ethylene) | 50 | 1.060 |  |  |  |  |
|  | Natural rubber | 60 | 0.860 |  | 50 | 60 | 60 |
|  | Mixture specific gravity A |  |  | 0.97 | 0.99 | 0.964 | 0.964 |
| Antifreezing agent | EG | Specific gravity at 25° C. | 1.113 |  | 100 | 100 |  |
|  | PG |  | 1.036 | 200 |  |  | 100 |
|  | DEG |  | 1.116 |  |  |  |  |
|  | Gly |  | 1.261 |  |  |  |  |
|  | 1,3-PG |  | 1.059 |  |  |  |  |
| Water |  |  | 0.994 | 200 | 100 | 100 | 100 |
| Specific gravity B of mixture of anti-freezing agent and water |  |  |  | 1.015 | 1.086 | 1.086 | 1.015 |
| Difference in specific gravity (A − B) |  |  |  | −0.045 | −0.10 | −0.12 | −0.05 |
| Solids (% by mass) |  |  |  | 15.3 | 26.1 | 26.3 | 26.3 |
| Vibration test results (20 Hz, 3 mm, 1 wk at 80° C.) |  |  |  | Fail | Excellent | Fail | Excellent |
| Puncture-sealing ability |  |  |  | Fail | — | Excellent | — |

TABLE 4

|  |  |  |  | Sample No. | | | |
|---|---|---|---|---|---|---|---|
|  |  |  |  | 28 | 29 | 30 | 31 |
|  |  |  |  | Working Example/Comparative Example | | | |
|  |  | Solids (% by mass) | Specific gravity at 25° C. | Comparative Example | Working Example | Comparative Example | Working Example |
|  |  |  |  | Mixture ratio (solids) | | | |
| Latex or emulsion | Polyurethane (TDI-based) | 40 | 1.120 |  |  |  |  |
|  | Polyurethane (HDI-based) | 40 | 0.870 |  |  |  |  |
|  | EVA (30% ethylene) | 50 | 1.120 |  |  |  |  |
|  | EVA (50% ethylene) | 50 | 1.010 | 50 | 70 | 70 | 70 |
|  | EVA (60% ethylene) | 50 | 1.060 |  |  |  |  |

TABLE 4-continued

|  |  |  | Solids (% by mass) | Specific gravity at 25° C. |  |  |  |  |
|---|---|---|---|---|---|---|---|---|
|  | Natural rubber |  | 60 | 0.860 | 50 | 30 | 30 | 30 |
|  | Mixture specific gravity A |  |  |  | 0.935 | 0.965 | 0.965 | 0.965 |
| Antifreezing agent | EG | Specific gravity at 25° C. | 1.113 |  |  |  |  |  |
|  | PG |  | 1.036 |  |  |  |  |  |
|  | DEG |  | 1.116 |  | 100 | 100 |  |  |
|  | Gly |  | 1.261 |  |  |  | 100 |  |
|  | 1,3-PG |  | 1.059 |  |  |  |  | 100 |
| Water |  |  | 0.994 |  | 100 | 100 | 100 | 100 |
| Specific gravity B of mixture of anti-freezing agent and water |  |  |  |  | 1.055 | 1.055 | 1.1275 | 1.0265 |
| Difference in specific gravity (A − B) |  |  |  |  | −0.12 | −0.09 | −0.1625 | −0.0615 |
| Solids (% by mass) |  |  |  |  | 25.7 | 25.6 | 25.6 | 25.6 |
| Vibration test results (20 Hz, 3 mm, 1 wk at 80° C.) |  |  |  |  | Fail | Excellent | Fail | Excellent |
| Puncture-sealing ability |  |  |  |  | Excellent | — | Excellent | — |

|  |  |  | Solids (% by mass) | Specific gravity at 25° C. | Sample No. |  |  |
|---|---|---|---|---|---|---|---|
|  |  |  |  |  | 32 | 33 | 34 |
|  |  |  |  |  | Working Example/Comparative Example |  |  |
|  |  |  |  |  | Comparative Example | Working Example | Comparative Example |
|  |  |  |  |  | Mixture ratio (solids) |  |  |
| Latex or emulsion | Polyurethane (TDI-based) |  | 40 | 1.120 |  |  |  |
|  | Polyurethane (HDI-based) |  | 40 | 0.870 |  |  |  |
|  | EVA (30% ethylene) |  | 50 | 1.120 |  |  |  |
|  | EVA (50% ethylene) |  | 50 | 1.010 |  |  |  |
|  | EVA (60% ethylene) |  | 50 | 1.060 | 70 | 70 | 70 |
|  | Natural rubber |  | 60 | 0.860 | 30 | 30 | 30 |
|  | Mixture specific gravity A |  |  |  | 1.000 | 1.00 | 1.00 |
| Antifreezing agent | EG | Specific gravity at 25° C. | 1.113 |  |  |  |  |
|  | PG |  | 1.036 |  |  |  |  |
|  | DEG |  | 1.116 |  |  |  |  |
|  | Gly |  | 1.261 |  | 100 |  |  |
|  | 1,3-PG |  | 1.059 |  |  | 100 | 200 |
| Water |  |  | 0.994 |  | 100 | 100 | 200 |
| Specific gravity B of mixture of anti-freezing agent and water |  |  |  |  | 1.1305 | 1.0295 | 1.0295 |
| Difference in specific gravity (A − B) |  |  |  |  | −0.1305 | −0.0295 | −0.0295 |
| Solids (% by mass) |  |  |  |  | 25.6 | 25.6 | 16.9 |
| Vibration test results (20 Hz, 3 mm, 1 wk at 80° C.) |  |  |  |  | Fail | Excellent | Fail |
| Puncture-sealing ability |  |  |  |  | — | — | Fail |

The details of each component shown in the above tables are as follows.

Polyurethane (TDI-based): urethane emulsion; trade name: Bondic™ 330, produced by DIC; emulsion of urethane prepolymer obtained using toluene diisocyanate, 1,6-hexanediol adipate as a polyol, and dimethylol propionic acid; weight-average molecular weight: 200,000

Natural rubber: natural rubber latex; trade name: Hytex HA, produced by Nomura Trading Co., Ltd.

EG: Ethylene glycol (anti-freezing agent), produced by Wako Pure Chemicals, Ltd.

PG: propylene glycol (anti-freezing agent), produced by Sankyo Kagaku Yakuhin Co., Ltd.

Polyurethane (HDI-based): urethane emulsion; trade name: WLA 404, produced by DIC; emulsion of urethane prepolymer obtained using hexamethylene diisocyanate, polypropylene glycol as a polyol, and dimethylol propionic acid; weight-average molecular weight: 150,000

EVA (30% ethylene): emulsion of ethylene-vinyl acetate copolymerization resin; ethylene content: 30% by mass; vinyl acetate content: 70% by mass; trade name: SUMIKAFLEX™ 400 HQ, produced by Sumitomo Chemical; weight-average molecular weight: 450,000

EVA (50% ethylene): emulsion of ethylene-vinyl acetate copolymerization resin; ethylene content: 50% by mass; vinyl acetate content: 50% by mass; trade name: SUMIKAFLEX™ 410 HQ, produced by Sumitomo Chemical; weight-average molecular weight: 550,000

EVA (60% ethylene): emulsion of ethylene-vinyl acetate copolymerization resin; ethylene content: 60% by mass; vinyl acetate content: 40% by mass; trade name: SUMIKAFLEX™ 408 HQ, produced by Sumitomo Chemical; weight-average molecular weight: 400,000

DEG: diethylene glycol (anti-freezing agent), produced by Wako Pure Chemicals, Ltd.

Gly: glycerol (anti-freezing agent), produced by Wako Pure Chemical Industries, Ltd.

1,3-PG: 1,3-propanediol, produced by Wako Pure Chemical Industries, Ltd.

As is clear from the results shown in the tables above, samples 3-5, 18-20, 26, 28, 30, and 32 (comparative examples), in which the difference between the specific gravity of the solids and the specific gravity of the mixture of water and anti-freezing agent in the tire puncture sealant was greater than ±0.1, had inferior storage stability. Samples 14, 15, 24, and 34 (comparative examples), in which the content of solids was less than 20% by mass of the total mass of tire puncture sealant, had inferior storage stability.

By contrast, samples 1, 2, 6-13, 16, 17, 21-23, 25, 27, 29, 31, and 33 (working examples) had superior storage stability. Samples 1, 2, 6, 7, 11, and 21 had superior sealing performance.

Following the vibration test and puncture sealing ability evaluation test described above, the tire puncture sealants of samples 1, 2, 6-13, 16, 17, 21-23, 25, 27, 29, 31, and 33 (working examples) exhibited substantially no foaming, were easy to treat, and had superior workability.

The invention claimed is:

1. A tire puncture sealant containing a latex and/or an emulsion and an anti-freezing agent,
   the latex and/or emulsion containing, as solids, at least a polymer and/or an organic compound (other than the polymer),
   a content of total solids being from 20 to 65% by mass with respect to the total mass of the sealant, and
   the difference between the specific gravity of the total solids and the specific gravity of a mixture of water and anti-freezing agent in the tire puncture sealant being within ±0.1, the tire puncture sealant containing a latex and/or an emulsion, solids of which have a specific gravity of 1 or less, and a latex and/or an emulsion, solids of which have a specific gravity of greater than 1.

2. The tire puncture sealant according to claim 1, wherein a surfactant is not added thereto, or a surfactant is further added thereto in an amount of no more than 0.5 parts by weight per 100 parts by weight of the solids.

3. The tire puncture sealant according to claim 1, wherein the anti-freezing agent is at least one type selected from the group consisting of ethylene glycol, propylene glycol, diethylene glycol, glycerin, and 1,3-propanediol.

4. The tire puncture sealant according to claim 1, wherein the mass ratio of the water and the anti-freezing agent is from 20:80 to 50:50.

5. The tire puncture sealant according to claim 1, wherein a specific gravity of the solids is from 0.82 to 1.15.

6. The tire puncture sealant according to claim 1, wherein the specific gravity of the mixture of water and anti-freezing agent is from 0.95 to 1.15.

7. The tire puncture sealant according to claim 1, wherein the emulsion is a synthetic resin emulsion.

8. The tire puncture sealant according to claim 1, wherein the latex is natural rubber latex.

9. The tire puncture sealant according to claim 1, wherein the specific gravity of solids in the latex is from 0.82 to 0.93.

10. The tire puncture sealant according to claim 1, wherein the sealant contains the latex and the emulsion, the latex is natural rubber latex, the emulsion is a synthetic resin emulsion, and the specific gravity of the solids in the synthetic resin emulsion is at least 0.1 greater than the specific gravity of the solids in the natural rubber latex.

11. The tire puncture sealant according to claim 1, wherein the polymer is at least one type selected from the group consisting of natural rubber, urethane resin, acrylic resin, polyolefin, polyvinyl acetate, polyvinyl chloride, ethylene-vinyl acetate copolymer, and ethylene-vinyl acetate-vinyl versatate copolymer.

12. The tire puncture sealant according to claim 11, wherein a vinyl acetate content contained in the ethylene-vinyl acetate copolymer is no more than 55% by mass of the ethylene-vinyl acetate copolymer.

13. The tire puncture sealant according to claim 11, wherein the urethane resin is a compound formed using an aromatic polyisocyanate, an aromatic polyol, and a polyol containing an ionic functional group.

14. A tire puncture sealant containing only a latex and/or an emulsion and an anti-freezing agent,
   the latex and/or emulsion containing, as solids, at least a polymer and/or an organic compound (other than the polymer),
   a content of total solids being from 20 to 65% by mass with respect to the total mass of the sealant, and
   the difference between the specific gravity of the total solids and the specific gravity of a mixture of water and anti-freezing agent in the tire puncture sealant being within ±0.1, the tire puncture sealant containing a latex and/or an emulsion, solids of which have a specific gravity of 1 or less, and a latex and/or an emulsion, solids of which have a specific gravity of greater than 1.

15. The tire puncture sealant according to claim 14, wherein the mass ratio of the water and the anti-freezing agent is from 20:80 to 50:50.

16. The tire puncture sealant according to claim 14, wherein a specific gravity of the solids is from 0.82 to 1.15.

17. The tire puncture sealant according to claim 14, wherein the specific gravity of the mixture of water and anti-freezing agent is from 0.95 to 1.15.

18. The tire puncture sealant according to claim 14, wherein the specific gravity of solids in the latex is from 0.82 to 0.93.

19. The tire puncture sealant according to claim 14, wherein the sealant contains the latex and the emulsion, the latex is natural rubber latex, the emulsion is a synthetic resin emulsion, and the specific gravity of the solids in the synthetic resin emulsion is at least 0.1 greater than the specific gravity of the solids in the natural rubber latex.

* * * * *